(12) United States Patent
Karmon et al.

(10) Patent No.: US 10,488,939 B2
(45) Date of Patent: Nov. 26, 2019

(54) GESTURE RECOGNITION

(71) Applicant: Microsoft Technology Licensing, LLC, Redmond, WA (US)

(72) Inventors: Kfir Karmon, Petach Tikva (IL); Aharon Bar-Hillel, Kiryat Ono (IL); Eyal Krupka, Redmond, WA (US); Noam Bloom, Tel Aviv (IL); Ilya Gurvich, Tel Aviv (IL); Aviv Hurvitz, Tel Aviv (IL); Ido Leichter, Haifa (IL); Yoni Smolin, Shimshit (IL); Yuval Tzairi, Haifa (IL); Alon Vinnikov, Ramat Gan (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 297 days.

(21) Appl. No.: 15/671,118

(22) Filed: Aug. 7, 2017

(65) Prior Publication Data
US 2018/0307319 A1 Oct. 25, 2018

Related U.S. Application Data

(60) Provisional application No. 62/487,632, filed on Apr. 20, 2017.

(51) Int. Cl.
*G06F 3/01* (2006.01)
*G06K 9/00* (2006.01)
(Continued)

(52) U.S. Cl.
CPC ............ *G06F 3/017* (2013.01); *G06F 3/0304* (2013.01); *G06K 9/00355* (2013.01); *G06K 9/00389* (2013.01); *G06K 9/4604* (2013.01)

(58) Field of Classification Search
USPC .......................................... 382/103, 155, 159
See application file for complete search history.

(56) References Cited

U.S. PATENT DOCUMENTS 9,002,099 B2 * 4/2015 Litvak ................ G06K 9/00382
382/154
9,189,068 B2 11/2015 Im
(Continued)

OTHER PUBLICATIONS

Hong, et al., "Gesture Modeling and Recognition Using Finite State Machines", In Proceedings of IEEE Conference on Face and Gesture Recognition, Mar. 2000, pp. 1-6.
(Continued)

*Primary Examiner* — Ishrat I Sherali

(57) ABSTRACT

A gesture recognition method comprises receiving at a processor from a sensor a sequence of captured signal frames for extracting hand pose information for a hand and using at least one trained predictor executed on the processor to extract hand pose information from the received signal frames. For at least one defined gesture, defined as a time sequence comprising hand poses, with each of the hand poses defined as a conjunction or disjunction of qualitative propositions relating to interest points on the hand, truth values are computed for the qualitative propositions using the hand pose information extracted from the received signal frames, and execution of the gesture is tracked, by using the truth values to determine which of the hand poses in the time sequence have already been executed and which of the hand poses in the time sequence is expected next.

20 Claims, 9 Drawing Sheets

(51) Int. Cl.
*G06F 3/03* (2006.01)
*G06K 9/46* (2006.01)

(56) References Cited

U.S. PATENT DOCUMENTS

| | | | |
|---|---|---|---|
| 9,536,135 B2 | 1/2017 | Zhang et al. | |
| 10,186,081 B2* | 1/2019 | Taylor | G06T 17/205 |
| 10,296,102 B1* | 5/2019 | Misra | G06F 3/017 |
| 2011/0110560 A1* | 5/2011 | Adhikari | G06F 3/017 382/103 |
| 2011/0219340 A1 | 9/2011 | Pathangay et al. | |
| 2014/0123077 A1 | 5/2014 | Kutliroff et al. | |
| 2015/0269425 A1* | 9/2015 | Mazurenko | G06K 9/00355 382/103 |
| 2016/0085310 A1* | 3/2016 | Shotton | G06F 3/017 382/103 |
| 2016/0086025 A1* | 3/2016 | Shotton | G06K 9/00369 382/103 |
| 2016/0116984 A1 | 4/2016 | St. hilaire et al. | |
| 2016/0132786 A1* | 5/2016 | Balan | G06N 20/00 706/12 |
| 2016/0283784 A1* | 9/2016 | Kounavis | G06K 9/00355 |

OTHER PUBLICATIONS

Linn, Allison, "Talking with your hands: How Microsoft researchers are moving beyond keyboard and mouse", https://blogs.microsoft.com/next/2016/06/26/talking-hands-microsoft-researchers-moving-beyond-keyboard-mouse/, Published on: Jun. 26, 2016, 8 pages.
Jo, et al., "Manipulative hand gesture recognition using task knowledge for human computer interaction", In Proceedings of Third IEEE International Conference on Automatic Face and Gesture Recognition, Apr. 14, 1998, pp. 1-6.
J., Chandrika, "Intel RealSense SDK UX Design Guidelines", https://software.intel.com/en-us/articles/intel-realsense-sdk-ux-design-guidelines, Published on: May 29, 2015, 1 page.
Tagliasacchi, et al., "Robust Articulated-ICP for Real-Time Hand Tracking", In Proceedings of Eurographics Symposium on Geometry Processing, vol. 34, No. 5, Jul. 6, 2015, 14 pages.
Bar-Hillel, et al., "Convolutional Tables Ensemble: Classification in Microseconds", In Journal of Computing Research Repository, Feb. 2016, 10 pages.
Chen, et al., "3D Collaboration Method over HoloLens and Skype End Points", In Proceedings of 3rd International Workshop on Immersive Media, Oct. 30, 2015, pp. 27-30.
Chen, et al., "Real-time Vision-based Hand Gesture Recognition Using Haar-like Features", In Proceedings of Instrumentation and Measurement Technology Conference, May 1, 2007, 6 pages.
Choi, et al., "A Collaborative Filtering Approach to Real-Time Hand Pose Estimation", In Proceedings of IEEE International Conference on Computer Vision, Dec. 7, 2015, pp. 2336-2344.
Derpanis, et al., "Hand Gesture Recognition within a Linguistics-Based Framework", In Proceedings of European Conference on Computer Vision, May 11, 2004, pp. 1-14.
Desai, et al., "A Review Paper on Oculus Rift—A Virtual Reality Headset", In International Journal of Engineering Trends and Technology, vol. 13, No. 4, Jul. 2014, pp. 175-179.

Erol, et al., "Vision-based hand pose estimation: A review", In Journal of Computer Vision and Image Understanding, vol. 108, Issue 1-2, Jan. 19, 2007, pp. 52-73.
Figueiredo, et al., "Prepose: Privacy, Security, and Reliability for Gesture-Based Programming", In Proceedings of IEEE Symposium on Security and Privacy, May 22, 2016, 16 pages.
Hachaj, et al., "Rule-based approach to recognizing human body poses and gestures in real time", In Journal of Multimedia Systems, vol. 20, Issue 1, Feb. 2014, pp. 81-99.
Keskin, et al., "Hand Pose Estimation and Hand Shape Classification Using Multi-layered Randomized Decision Forests", In Proceedings of 12th European Conference on Computer Vision, Oct. 7, 2012.
Kin, et al., "Proton++: A Customizable Declarative Multitouch Framework", In Proceedings of 25th Annual ACM Symposium on User Interface Software and Technology, Oct. 7, 2012, pp. 477-486.
Krupka, et al., "Discriminative Ferns Ensemble for Hand Pose Recognition", In Proceeding of IEEE Conference on Computer Vision and Pattern Recognition, Jun. 23, 2014, 8 pages.
Oberweger et al., "Hands Deep in Deep Learning for Hand Pose Estimation", In Proceeding of 20th Computer Vision Winter Workshop, Feb. 9, 2015, 10 pages.
Oberweger, et al., "Training a Feedback Loop for Hand Pose Estimation", In Proceedings of International Conference on Computer Vision, Dec. 7, 2015, pp. 3316-3324.
Sharp, et al., "Accurate, Robust, and Flexible Real-time Hand Tracking", In Proceedings of 33rd Annual ACM Conference on Human Factors in Computing Systems, Apr. 18, 2015, pp. 3633-3642.
Song, et al., "In-air Gestures around Unmodified Mobile Devices", In Proceedings of 27th Annual ACM Symposium on User Interface Software and Technology, Oct. 5, 2014, pp. 319-329.
Spano, et al., "GestIT: A Declarative and Compositional Framework for Multiplatform Gesture Definition", In Proceedings of 5th ACM SIGCHI Symposium on Engineering Interactive Computing Systems, Jun. 24, 2013, pp. 187-196.
Sridhar, et al., "Investigating the Dexterity of Multi-Finger Input for Mid-Air Text Entry", In Proceedings of ACM Conference on Human Factors in Computing Systems, Apr. 18, 2015, pp. 3643-3652.
Sridhar, et al., "Fast and Robust Hand Tracking Using Detection-Guided Optimization", In Proceedings of Computer Vision and Pattern Recognition, Jun. 8, 2015, pp. 3213-3221.
Sridhar, et al., "Interactive Markerless Articulated Hand Motion Tracking Using RGB and Depth Data", In Proceedings of IEEE International Conference on Computer Vision, Dec. 1, 2013, pp. 2456-2463.
Sridhar, et al., "Real-time Hand Tracking Using a Sum of Anisotropic Gaussians Model", In Proceedings of International Conference on 3D Vision, Dec. 8, 2014, 8 pages.
Tang, et al., "Latent Regression Forest: Structured Estimation of 3D Articulated Hand Posture", Latent Regression Forest: Structured Estimation of 3D Articulated Hand Posture, Jun. 24, 2014, pp. 1-8.
Taylor, et al., "Efficient and Precise Interactive Hand Tracking Through Joint, Continuous Optimization of Pose and Correspondences", In Journal of ACM Transactions on Graphics, vol. 35, Issue 4, Jul. 2016, 12 pages.
Tompson, et al., "Real-Time Continuous Pose Recovery of Human Hands Using Convolutional Networks", In Journal of ACM Transactions on Graphics, vol. 33, Issue 5, Aug. 2014, 10 pages.

\* cited by examiner

```
<Gesture Name="RotateGesture">
  <Gesture.Segments>
    <IdleGestureSegment Name="Idle"/>
    <SingleHandPose Name="LockObjectPose">
      <FingersPose Context="Thumb, Index" Flexion="Open" Direction="Forward"/>
      <FingersLocalityRelation Context="Thumb, Index" LocalityRelation="Above" OtherContext="Thumb"/>
      <FingersTangencyRelation Context="Index" TangencyRelation="NotTouching" OtherContext="Thumb"/>
    </SingleHandPose>
    <SingleHandPose Name="RotatedObjectPose">
      <FingersPose Context="Thumb, Index" Flexion="Open" Direction="Forward"/>
      <FingersLocalityRelation Context="Thumb, Index" LocalityRelation="Right" OtherContext="Thumb"/>
      <FingersTangencyRelation Context="Index" TangencyRelation="NotTouching" OtherContext="Thumb"/>
    </SingleHandPose>
  </Gesture.Segments>
  <Gesture.SegmentsConnections>
    <SegmentConnections From="Idle" To="Idle, LockObject"/>
    <SegmentConnections From="LockObject" To="RotatedObject"/>
    <SegmentConnections From="RotatedObject" To="Idle"/>
  </Gesture.SegmentsConnections>
</Gesture>
```

FIG. 4c

GESTURE RECOGNITION

RELATED APPLICATIONS

This application claims priority under 35 U.S.C. Section 119(e) to U.S. Provisional Patent Application No. 62/487,632, filed Apr. 20, 2017 and titled "Toward Realistic Hands Gesture Interface: Keeping it Simple for Developers and Machines", the entire disclosure of which is hereby incorporated by reference.

TECHNICAL FIELD

This disclosure relates to gesture recognition.

BACKGROUND

A user interface (UI) refers to a mechanism by which a user and a computer can interact with one another. The purpose of a so-called natural user interface (NUI) is to allow a user to interact with a device in a "natural" manner, free from artificial constraints imposed by certain input devices such as mice, keyboards, remote controls, and the like. Examples of NUI methods include those utilizing "free-space" motion gesture detection using cameras (such as stereoscopic or time-of-flight camera systems, infrared camera systems, Red, Green, Blue (RGB) camera systems etc.), accelerometers/gyroscopes or other motion sensors, radar or radar-like sensors etc; voice and speech recognition; intention and goal understanding; touch sensitive displays, particularly when combined with gesture recognition whereby the user can make (single or multi-touch gestures) on the touchscreen; gaze tracking etc.

SUMMARY

According to a first aspect of the subject matter disclosed herein, a gesture recognition method comprises: receiving at a processor from a sensor a sequence of captured signal frames for extracting hand pose information for hand; using at least one trained predictor executed on the processor to extract hand pose information from the received signal frames; for at least one defined gesture, wherein the gesture is defined as a time sequence comprising hand poses, wherein each of the hand poses is defined as a conjunction or disjunction of qualitative propositions relating to interest points on the hand: computing truth values for the qualitative propositions using the hand pose information extracted from the received signal frames, and tracking execution of the gesture, by using the truth values to determine which of the hand poses in the time sequence have already been executed and which of the hand poses in the time sequence is expected next, wherein upon completion of the sequence, a function associated with the gesture is triggered.

This mechanism of defining (dynamic) gestures as sequences of (static) hand poses, where the hand poses can be flexibility defined using qualitative propositions, provides a flexible and efficient framework for creating and recognizing custom gestures. The predictors are trained in a manner that allows these predetermined qualitative propositions to be assessed at runtime. Custom hand poses can be created by combining these predetermined propositions in any desired manner, and a custom gesture can be defined as any desired sequence of such hand poses, without having to re-train the system.

The signal frames can for example be visual signal frames, such as images captured by a camera/image capture device (visible light and/or infrared), or spatial signal frames, captured by a radar sensor, sonar sensor, or other such sensor.

In embodiments, the interest points may comprise the fingertips and palm center of the hand.

In embodiments, the qualitative propositions may be obtained by applying predicates to the interest points of the hand.

In embodiments, the predicates may comprise at least one of the following predicates: palm direction, palm orientation, finger direction, finger flexion, finger tangency, finger relative position.

In embodiments, the hand pose information may be extracted in multiple stages, wherein at each of the stages a piece of the hand pose information may be extracted using a set of one or more predictors.

In embodiments, the piece of hand pose information may be extracted from each of the signal frames at a later one of the stages in dependence on the piece of hand pose information extracted from that signal frame at an earlier one of the stages.

In embodiments, only a subset of one or more predictors selected from a set of available trained predictors may be activated at the later stage to extract the piece of hand pose information from that signal frame at the later stage, that subset of predictors being selected for that signal frame based on the piece of information extracted from that signal frame at the earlier stage.

In embodiments, at the earlier stage, a trained classifier may be used to classify the signal frame as belonging to at least one of a plurality of global hand orientation clusters, the piece of hand pose information being extracted at the later stage in dependence on the global hand orientation cluster to which the signal frame belongs.

In embodiments, at the later stage, the piece of hand pose information is extracted using at least one trained regressor.

In embodiments, only a subset of one or more regressors selected from a set of available trained regressors may be activated at the later stage to extract the piece of hand pose information from that signal frame at the later stage, that subset of regressors being selected for that signal frame based on the global hand orientation cluster to which the signal frame belongs.

In embodiments, the subset of one or more regressors may be used to determine a refined global hand orientation estimate, or location information for at least one finger of the hand.

In embodiments, regression may be performed separately for multiple fingers to determine location information for each of those fingers.

In embodiments, a fixed number of regression stages may be performed for each of the signal frames.

In embodiments, the predictors may be convolutional tables ensemble (CTE) predictors.

In embodiments, extracting the hand pose information may comprise estimating a hand pose for each of the signal frames.

The signal frames may be filtered signal frames generated by applying a temporal filter to unfiltered (e.g. "raw") frames captured by the sensor, whereby each of the filtered signal frames comprises information from multiple unfiltered frames.

The sensor may comprise a camera (visible light and/or infrared) and the signal frames may be images of the hand captured by the camera. Alternatively or in addition, the sensor can comprise one or more other forms of sensing device, such a sonar sensing device, radar sensing device or similar.

The time sequence also comprises at least one motion element, which is a qualitative indicator of hand motion. That is, a gesture may be defined as a sequence of hand poses and hand motions(s).

Another aspect provides a computer program product comprising executable instructions configured, when executed on a processor, to implement the method of the first aspect or any of its embodiments.

Another aspect provides gesture recognition device comprising: a sensor for use in capturing a sequence of captured signal frames for extracting hand pose information for a hand; a processor configured to implement the method of the first aspect of any of its embodiments.

According to a another aspect of the subject matter disclosed herein, a gesture recognition method comprises: receiving at a processor from a camera a sequence of captured images of a hand; using at least one trained predictor executed on the processor to extract hand pose information from the received images; for at least one defined gesture, wherein the gesture is defined as a time sequence comprising hand poses, wherein each of the hand poses is defined as a conjunction or disjunction of qualitative propositions relating to interest points on the hand: computing truth values for the qualitative propositions using the hand pose information extracted from the received images, and tracking execution of the gesture, by using the truth values to determine which of the hand poses in the time sequence have already been executed and which of the hand poses in the time sequence is expected next, wherein upon completion of the sequence, a function associated with the gesture is triggered.

BRIEF DESCRIPTION OF FIGURES

For a better understanding of the subject matter, and to show how embodiments of the same may be carried into effect, reference is made by way of example only to the following figures in which:

FIG. 4a shows an example gesture defined as a sequence of two static poses, and FIGS. 4b and 4c show examples of formal language definitions of the gesture in C# and Extensible Application Markup Language (XAML) respectively;

DETAILED DESCRIPTION OF EXAMPLE EMBODIMENTS

As described below, a simple language for the design of a hand-gesture-based user interface and a set of development tools enabling rapid development are provided. An algorithmic pipeline, based on fast CTE (convolutional tables ensemble) classifiers, is able to combine high speed with state of the art accuracy, and enables recognition of general gestures expressed in the proposed language. The described system represents an important step forward in the development and employment of general and practical gesture-based interfaces, accessible to any developer.

Development of a rich hand-gesture-based interface is currently a tedious process, requiring expertise in computer vision and/or machine learning. This is addressed by introducing a simple language for pose and gesture description, a set of development tools for using it, and an algorithmic pipeline that recognizes it with high accuracy. The language is based on a small set of basic propositions, obtained by applying four predicate-types to the fingers and to palm center: direction, relative location, finger touching and finger folding state. This enables easy development of a gesture-based interface, using coding constructs, gesture definition files or an editing graphical user interface (GUI). The language is recognized from three-dimensional (3D) camera input with an algorithmic pipeline composed of multiple classification regression stages, trained on a large annotated dataset. Experimental results indicate that the pipeline enables successful gesture recognition with a very low computational load, thus enabling a gesture-based interface on low-end processors.

Although 3D camera input is used as example herein, the subject matter is not limited in this respect. For example, an infrared (IR) only solution is possible, which does not require a 3D camera, as is the use radar/sonar like signals that will further make the solution more private and light-weight compute wise. It will be appreciated that all description pertaining to 3D camera input applies equally to other forms of sensor input, and that all description pertaining to images applies equally to other forms of spatial or visual signal frame.

Figure 1:
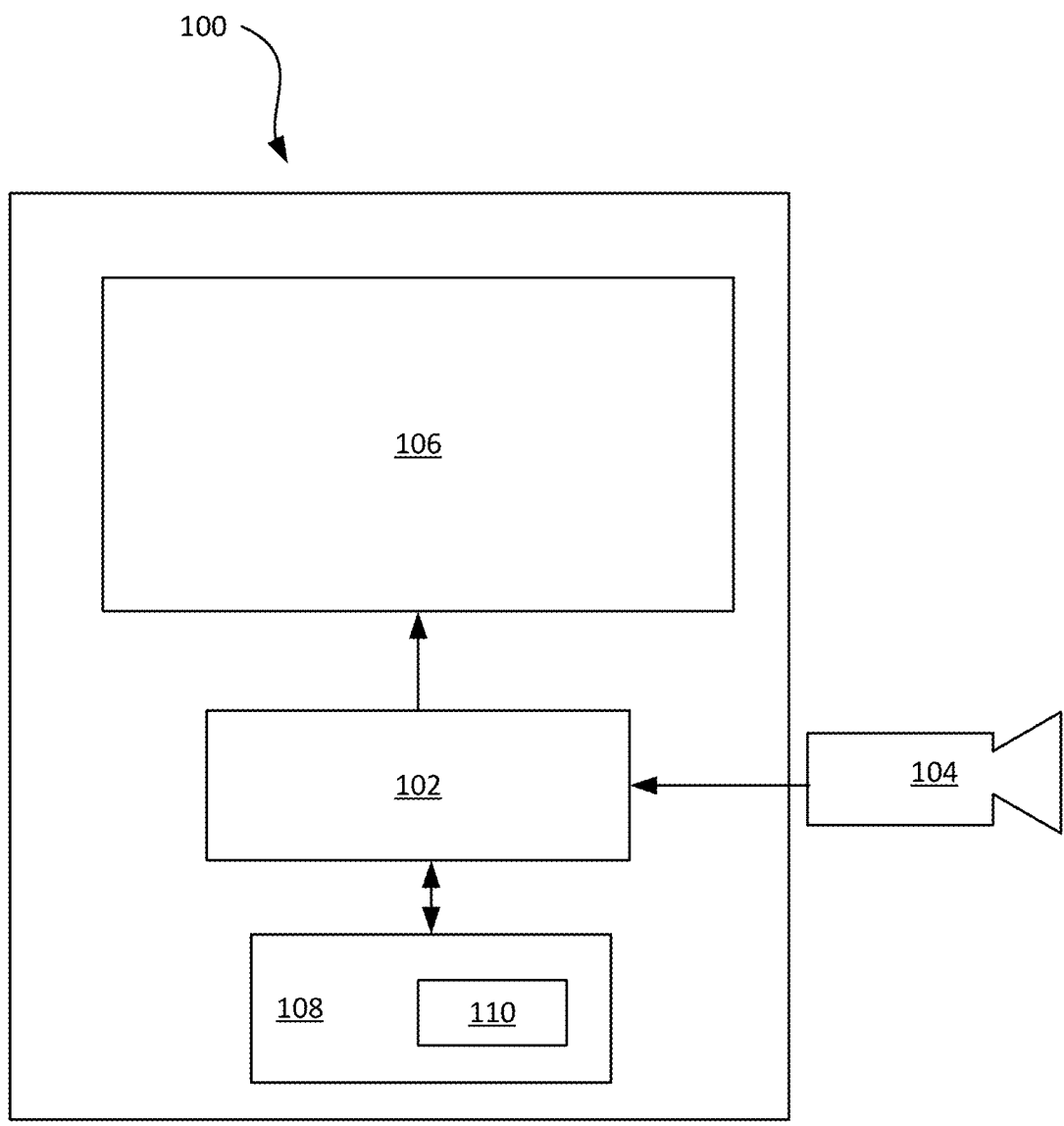
FIG. 1 shows a schematic block diagram of an example gesture recognition device.

FIG. 1 shows a highly schematic block diagram of a gesture recognition device 100, which is a computer device comprising a processor 102 and, connected to the processor 102, a camera 104 (image capture device), which is a 3D camera for capturing two-dimensional (2D) images and associated depth information for elements captured in the 2D images, relating to their distance from the camera 104; a display 106; and electronic storage 108 in the form of one or more storage devices, such as Random Access Memory (RAM) or Direct Memory Access (DMA) devices, or "disk" storage devices such as solid-state (e.g. Flash, negative-AND (NAND), etc.) or magnetic storage devices. Examples of 3D cameras include, for example, stereo cameras, time-of-flight cameras, cameras which map 3D information based on infrared projection, structured light cameras etc. The electronic storage 108 is shown holding computer readable instructions 110 (code). The processor 102 executes the instructions 110 so as to carry out the functionality disclosed herein. In particular, the code 110 allows the device 100 to recognize (free-space) hand gestures from images captured by the camera 104, which are used to control a user interface (UI) rendered on the display 106. The processor 102 may be a Central Processing Unit (CPU) and a particular benefit of the disclosed gesture recognition is that it can be efficiently executed on a single thread of the main CPU without compromising performance significantly. However, the possibility of implementing the functions in a multi-threaded environment or at least in part on specialized processor hardware, such as a Graphics Processing Unit (GPU), are not excluded, and it is noted that the processor can have multiple threads (one or more of which can be used to perform the described functions), and that it may comprise multiple CPUs/CPU cores, e.g. in a multi-core processor (one or more of which can be used to perform the described functions), and/or specialized processing hardware such as a GPU(s).

Hand gestures are a natural communication mode for humans, and a promising direction for a human-computer interface. Scenarios of interests range from personal computers to mobile devices and to emerging virtual and augmented reality platforms. In addition, advances in depth camera imaging and computer vision have made such an interface possible in recent years. However, a practical gesture-based interface still faces severe difficulties, due to conflicting demands on both the development and run-time environments. Development of a rich gesture-based interface is currently a considerable effort requiring long development cycles with teams skilled in computer vision and machine learning. A common alternative is to use a mature-tuned system, but these typically offer a small predefined set of gestures to choose from, thus limiting the uniqueness and richness of the experience. In the run-time environment, the dilemma is between system accuracy and its computational demands. With existing technology, at best real time performance may be achieved using multi-core CPUs. However, a useful system should utilize only a fraction of the CPU power, so it does not disturb other running applications, yet maintain accuracy and responsiveness. These contradicting demands are exacerbated in low-power, low-end CPUs used in mobile devices.

The described technology addresses these difficulties by introducing a simple language for the definition of poses and gestures, and by developing a set of tools and algorithms demonstrating that the language is practical for both development and algorithmic recognition. The contribution is three-fold. First, a language is proposed. In its design, a primary guideline was to keep it simple enough so that development is easy, yet expressive enough to enable most of the gestures coming to a developer's mind. Second, a set of tools is provided that enables natural development of a gesture-based interface, without pre-requisite knowledge in algorithms or machine vision. These tools enable gesture definition using code, XAML files or an editing Graphical User Interface (GUI), and include visualization and verification tools. Third, an algorithmic pipeline is provided which enables recognition of the defined gestures from a 3D camera stream (or IR/RGB, sonar/radar stream etc. in other implementations—see above), with high accuracy. This pipeline includes many extremely fast predictors, operating in multiple stages, and trained on a large annotated data corpus. With this pipeline, real time performance can be achieved with a single thread, using only a small fraction of the CPU.

The language is based on four basic predicates which are naturally used to describe hand poses, applied to six main interest points of the hand: the five fingertips and the palm center. The predicates are: pointing direction ('the thumb points up'), relative location ('the index is above the middle'), fingertip touching ('the ring finger touches the thumb') and finger flexion ('the pinky is folded'). Using these predicates, 102 (one hundred and two) basic propositions are created, which serve as the basic binary building blocks of the calculus. A hand pose (sometimes termed 'posture') is defined mainly as a conjunction of the basic propositions, with disjunctions partially allowed in certain cases. A gesture, in turn, is defined plainly as a sequence of hand poses. Defining a gesture in this language is fairly straightforward, due to its proximity to pose description in natural language, and the gesture developer is not asked to state continuous parameters like distances or angles. Despite its qualitative nature, the language is very expressive. For example, it can express without difficulty the basic signs in the American Sign Language (ASL) phonology, and the basic poses used in several current commercial systems. See FIG. 2 for some examples.

Based on the proposed language, a gesture based interface can be built using several possible tools. For a C# programmer, a pose class can be defined in a few lines of code, and a gesture class can be constructed once all of its constituent poses are defined. Above the code interface, additional layers are added to enable gesture definitions by non-programmers. A simple text parser enables definition of poses and gestures using XAML code. The parser then creates the appropriate C# classes. In addition, a visual gesture editor is able to display the poses as states in a sequence. The editor enables pose manipulations using context sensitive menus, and its output can be exported into XAML format. For visualizing the edited poses in real time, a fast inverse kinematics algorithm is provided, utilizing the language's simplicity. The algorithm produces a pose satisfying the chosen propositions, which is then rendered using a generic hand model. Finally, this system aids in identifying non-valid hand definitions.

The algorithmic pipeline which recognizes the language has to resolve the accuracy versus speed tension mentioned earlier. To ease this tension, Convolutional Table Ensemble (CTE) classifiers and regressors are used. These are extremely fast predictors, typically processing an image in less than a millisecond. The CTE architecture enables trading of training sample size for speed and accuracy, that is: by using a larger sample size at the training stage, the run-time predictor can be made faster while keeping the same accuracy. The pipeline includes several stages, each employing a set of CTEs. In the first stage, the position of the hand center is found and the image is centered around it. Then the global hand orientation is found, framed as a classification problem into 16 discrete pose clusters, and is then refined. At a third stage the location and direction of the fingertips are found, by applying a cluster-specific regressor. This regressor in turn includes several stages of regressing the fingertip location, centering the image around the tip and regressing again for refinement. Finally, the truth value of the basic 102 language propositions is inferred from the fingertips and palm center locations.

Note, although CTE predictors are used as an example in the following description, the subject matter is not limited in this respect. For example, DNN (deep neural network)/CNN (convolutional neural network) predictors (classifiers/regressors) may be equally viable (for example in with combination CTE predictors/regressors) or for that matter any form of predictor.

In order to obtain the speed and accuracy benefits from the CTE architecture, a large dataset is required for training. In the described system, however, this training is a one-time event and no machine learning effort is required from the gesture developer. The described system has been implemented by collecting more than 360,000 annotated images for the pipeline training, using a custom-built dome-shaped structure equipped with multiple cameras. With a target camera using IR, colors which are IR-invisible could be used to mark interest points on the hands of the subjects. Some annotation was then automatically collected using a set of surrounding RGB cameras, while another portion, like exact fingertip locations, required manual tagging.

The accuracy of the described algorithm has been evaluated on several levels: estimation of fingertip locations, recognition of the language propositions, and recognition of full gestures. Hand pose estimation is usually evaluated in the literature by considering statistics of the distance between fingertips position and their algorithmic estimates. The algorithm has been evaluated using these metrics in two publicly available datasets, NYU (New York University) and Dexter. Using NYU, which is the larger and more challenging dataset, the method is comparable to the best method, and using Dexter it is ranked third among nine methods. This accuracy is obtained in 14 millisecond per image on a single CPU thread—roughly an order of magnitude faster than any other method of similar accuracy. This degree of accuracy and speed enables a practical, real-time, gesture-based interface in a variety of scenarios. Moreover, unlike other leading methods, hand poses are recognized without using temporal information (from a single frame), which makes the measured accuracy robust to fast pose changes and short gestures.

Beyond fingertip localization errors, for real gesture recognition using a language of the type provided herein, the important statistics are the probabilities of correctly detecting basic propositions and full gestures. The capabilities for recognition of the basic propositions have been estimated using a test set of 61,397 images containing random hand poses. The system is able to recognize basic propositions 92% of the time with a false positive rate lower than 1.4%. For full gestures, the system has been tested using a set of 12 selected gestures, performed multiple times by 10 different persons, and an additional set of non-gesture hand activity clips for false alarm rate estimation. The pipeline achieves an average detection rate of 96% for users after a few minutes of practice.

Hand Pose Estimation Algorithms:

Language

The language disclosed herein is based on a set of qualitative basic propositions, such as "the index and middle are not touching". These propositions are close to gesture descriptions in natural language, and thereby enable easy pose characterization for the developer. To contrast, quantitative descriptions such as "keep the Index and Middle tips 3 cm away from each other" include parameters that are hard for the developer to estimate as they often do not have good intuition for their values. Moreover, even when they do estimate such values well for their own hands, the result is not likely to generalize well to people with different hand size or different morphology/flexibility. Tuning of such parameters is instead left for the system, in a manner that is invisible to the developer.

Basic Propositions

The propositions are obtained by applying two one-argument predicates (direction, flexion) and two two-argument predicates (relative direction, tangency) to one or two of six interest points on the hand: the fingertips and palm center. Direction and direction relationships are quantized to six canonical values: "Left (of the subject)", "Right", "Up", "Down", "Forward" and "Backward". The other two predicates, flexion and tangency, are naturally binary. Here are the basic propositions in detail:

Palm Pose:

Palm direction: This is the direction of the normal of the palm, pointing out of the forehand. Six propositions of the form "the palm points in direction X" are defined, for the six canonical directions.

Palm orientation: The direction pointing from the wrist to the base of the middle finger. Again six propositions are defined.

The operational definition of 'pointing toward a canonical direction' is that the pointing direction has a small angle with the canonical direction. However, the parameter, as any other parameter in the system, is not exposed to the developer. See FIG. 3a for visualization of the palm direction ($\mu_{normal}$ in the figure) and orientation ($\mu_{orientation}$) concepts.

Fingers:

Example predicate operations definitions for the thumb and fingers will now be described with reference to FIGS. 3a-e.

Finger direction: For each finger six propositions of pointing in the canonical directions are defined, for a total of thirty propositions. As shown in FIG. 3c, a finger is pointing 'up' if its direction 324 is in a cone 322 with the base placed at the fingertip. An analogous definition is given for the other five directions.

Finger flexion: For each finger two states are defined, as 'open' and 'folded', giving ten propositions. A non-thumb finger is declared folded if its tip is in the quarter of the space near the hand, as defined by two planes (See FIG. 3a). A similar characterization is given to the thumb (See FIG. 3b).

Figure 3A:
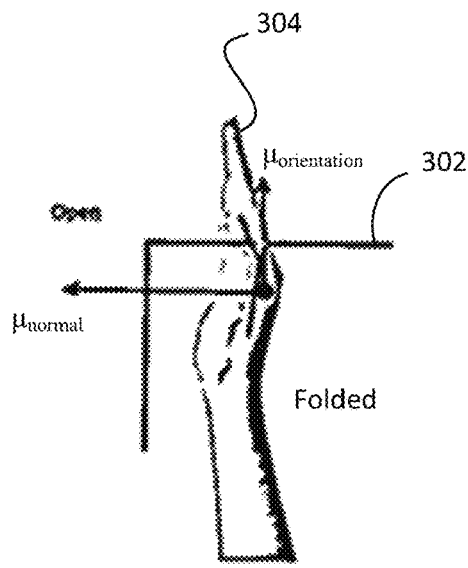
FIGS. 3a, 3b, 3c, 3d, and 3e illustrate examples of predicate operational definitions that can be used to characterize static hand poses.

In FIG. 3a, a non-thumb finger 304 is considered folded if its tip resides in a quarter marked as 302, defined by planes whose normals are the palm direction and palm orientation respectively.

Figure 3B:
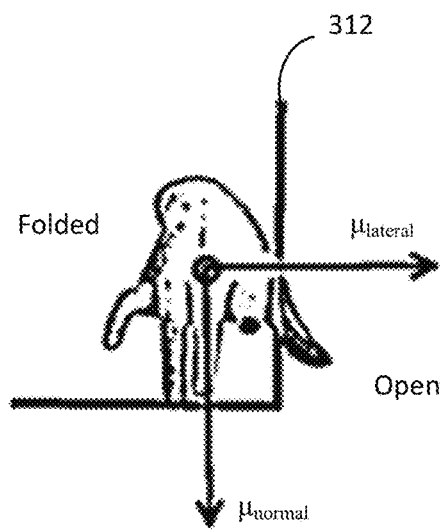
Figure 3C:
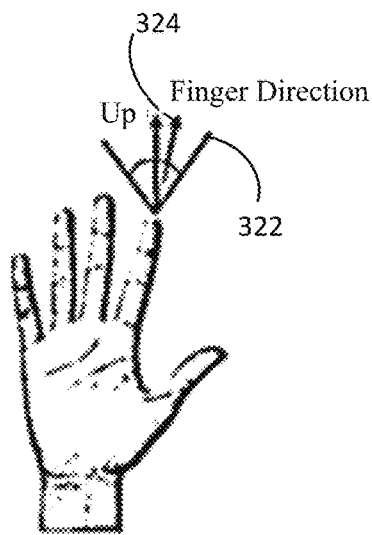

In FIG. 3b, a folding region 312 of the thumb is shown, where the thumb is considered folded if the tip of the thumb is within the thumb folding region 312.

Finger tangency: For each of the 10 possible finger pair combinations, an 'a is touching b' proposition is defined, as well as an 'a is not touching b' for a total of 20 propositions. To evaluate these propositions, the distance between fingers is defined as follows: K points, d millimeters apart from each other, are defined along the ray starting from the tip and pointing in the opposite of the finger direction. Two fingers are considered touching if the minimal distance between a point on one finger and the tip of the other is lower than a threshold (See FIG. 3d), and 'not touching' when this minimal distance is higher than a different, greater threshold, such that 'not touching' and 'touching' are not a simple negation of each other: typically there are cases where neither of them applies.

Figure 3D:
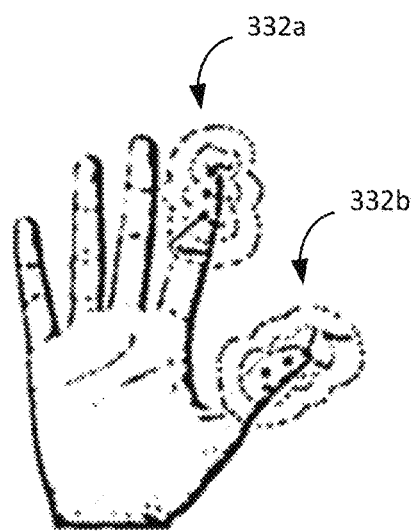

As shown in FIG. 3d, touching and not-touching relations are determined by the intersection of multiple balls 332a, 332b around the distal phalanges of the two fingers.

Finger relative position: For each finger pair, a proposition is defined stating that 'a is in direction C of b' where C is one of the 6 canonical directions. Since propositions like 'middle is above the thumb' and 'thumb is below the middle' are equivalent, this yields altogether 30 propositions. A proposition is satisfied if point a is in a cone whose base is at point b and its central axis is in the direction C (See FIG. 3e).

Figure 3E:
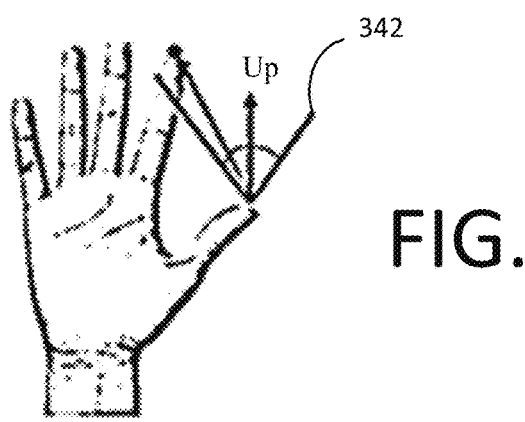

As shown in FIG. 3e, relative directions are determined using a cone 342 whose axis is aligned with canonical direction. Here the index is above the thumb because it falls in this cone for 'up' direction.

Poses and Gestures

Static hand poses are defined as conjunctions of propositions, where a proposition is either one of the basic one hundred and two propositions, or a 'direction-disjunction' over them. A direction disjunction is a statement such as 'the thumb points either left or up', that is: the disjunction is over several basic propositions differing only in the direction stated. A static hand pose can be detected from a single frame. Gestures are defined simply as sequences of poses in time. To complete a gesture, the user has to go through the sequence of defined poses, with the time interval between the poses no longer than a threshold parameter.

Figure 2A:
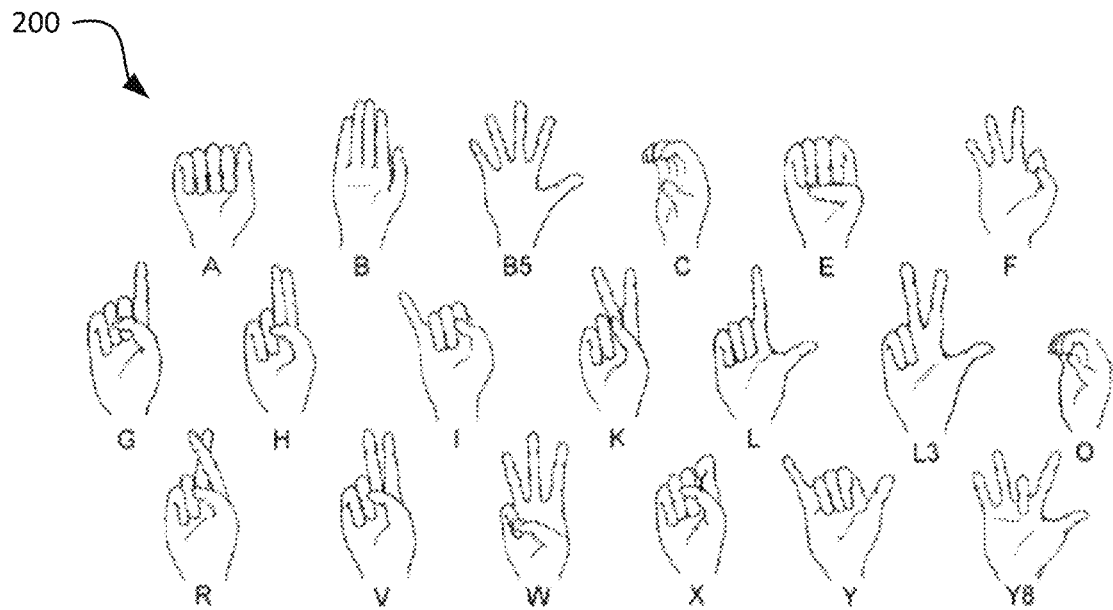
FIGS. 2a and 2b show example hand poses which can be defined as qualitative propositions relating to interest points on the hand.
Figure 2B:
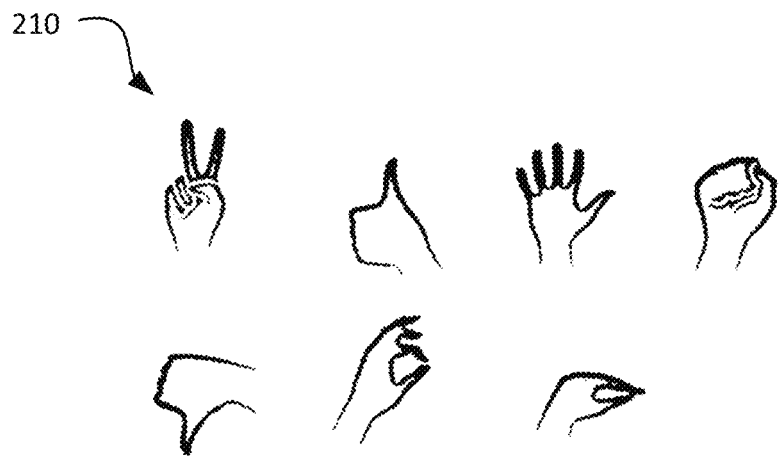

FIGS. 2a and 2b illustrate two example pose dictionaries to which the language has been applied successfully. Specifically, FIG. 2a shows hand shapes 200 found in a phonemic analysis of ASL. According to the analysis, these (together with location and motion elements) were found to be basic patterns characterizing the symbolic vocabulary of the language. Each of these hand poses can be well characterized, and distinguished from the others, using a few basic propositions utilizing the four base predicates: finger/palm direction, finger folding state, finger tangency and relative direction. FIG. 2b shows hand shapes 210 used in the static gestures of an existing commercial system. These can also be naturally described using the disclosed language.

FIGS. 3a-d show a set of example predicate operational definitions, which can be used to define static hand poses based on qualitative propositions relating to interest points on the hand.

Hand Pose Estimation Algorithm

A practical hand pose estimation algorithm is based on two high level ideas: multiple stage problem breakdown, and prediction based on clever memorization. The pose estimation task is broken into several stages, each with a small scope problem to solve. At each stage a set of very fast predictors is used (the CTE family) whose activation essentially amounts to indexing a set of tables. These tables, created during training, memorize hand pose information and enable fast answer prediction by gathering the votes across an ensemble.

Convolutional Table Ensembles (CTE)

A CTE predictor extracts codeword indices from multiple positions in the image, and uses them to index multiple tables. The tables' votes are combined linearly to predict the output of interest.

CTE predictors are known per se, and further details can for example be found in Aharon Bar-Hillel, Eyal Krupka, and Noam Bloom. 2016. Convolutional Tables Ensemble: classification in microseconds. CoRR abs/1602.04489 (2016). http://arxiv.org/abs/1602.04489. [1]

CTE predictors have been applied in the context of hand pose estimation in Eyal Krupka, Alon Vinnikov, Ben Klein, Aharon Bar Hillel, Daniel Freedman, and Simon Stachniak. 2014. Discriminative Ferns Ensemble for Hand Pose Recognition. In *The IEEE Conference on Computer Vision and Pattern Recognition (CVPR)*. [2]. In [2], the codeword indices are extracted using a set of independent questions, in which case the index computing structure is called a 'fern', and the classifier is termed a Discriminative Ferns Ensemble (DFE).

The ferns ensemble predictor operates on an image patch I, consisting of P pixels. For a single fern and pixel location $p \in \mathbb{N}^2$, a local descriptor for p's neighbourhood is computed using a set of $k=1, \ldots K$ binary questions of the form $$b_k = \sigma(I[p+\delta_k^1] - I[p+\delta_k^2] - t) \quad (1)$$

Where $\delta_k^1, \delta_k^2 \in \{-s, \ldots s\}^2$ are location offsets, $t \in \mathbb{R}$ is a threshold, and $\sigma(\cdot)$ is the Heavside function. These are simple and computationally-light questions, comparing the difference between two pixels to a threshold. For fern m, location p and question k denote the bit obtained by $b_{p,k}^m$. Concatenating the K bits together, a K-bit codeword $b_p^m$ is obtained for every fern and pixel location.

Histogram of Bit Vectors:

In order to obtain translation invariance a spatial histogram of codewords over pixel locations is computed. Denote the histogram for the $m^{th}$ fern by $H^m(I)$. An entry $b \in \{0,1\}^K$ of $H^m$ is defined by $$H_b^m = \sum_{p \in A^m} \delta(b_p^m - b) \quad (2)$$

where $\delta$ is a discrete delta function, and $A^m \subset \{1, \ldots P\}$ is the spatial aggregation region for fern m. Note that $H^m$ is a sparse vector, with at most P non-zero entries.

Histograms Concatenation:

The final output is computed by a linear classifier or regressor applied to the concatenation of the M fern histograms:

$$f(I) = W^T H(I) = \sum_{m=1}^{M} \sum_{b \in \{0,1\}^K} w_b^m H_b^m - \beta \quad (3)$$

with $H(I) = [H^1(I), \ldots, H^M(I)] \in \mathbb{N}^{M2^K}$, a weight vector $W = [W^1, \ldots, W^M] \in \mathbb{R}^{M2^K}$, and a bias term $\beta \in \mathbb{R}$. When multiple outputs are required (as in multiclass classification), C weight vectors and biases $\{W_c, \beta_c\}_{c=1}^{C}$ trained and used to obtain C output scores using the same set of ferns.

Run Time Classifier/Regressor:

Algorithm 1 (below) describes the operation of a DFE at test time. The pipeline is extremely simple. For each fern and each pixel in the fern's aggregation region the codeword index is computed, and the tables of all classes with this index are accessed to get the codeword's score contribution. The complexity is O (MA(K+C)) where A is the average number of pixels per aggregation region.

---

Algorithm 1 Ferns Ensemble computation

Input: An image I of size $S_x \times S_y$,
Classifier parameters $\{\Theta^m, A^m, W_c^m, \beta_c\}_{m=1, c=1}^{M,C}$
$\Theta^m = \{\delta_k^{1,m}, \delta_k^{2,m}, t_k^m\}_{k=1}^{K}, A^m \subset \{1, \ldots, S_x\} \times \{1, \ldots, S_y\}, W_c^m \in \mathbb{R}^{2^K}, \beta_c \in \mathbb{R}^C$
Output: Class scores vector Score
Initialization: For $c = 1, \ldots, C$ Score[c] = $-\beta_c$
For all ferns m = 1, ...,M
  For all pixels $p \in A^m$
    Compute a k-bit index $b_p^m$

| Algorithm 1 Ferns Ensemble computation |
| --- |
| For c =1, .C Score [c] = Score[c] + $W_c^m [b_p^m]$<br>Return Score |

CTE Training:

As described in [1, 2], a CTE is trained by iterating between adding a fern and training a global predictor over the current set of ferns' features. The global optimization is done with SVM (support vector machine) when classification is handled, and an SVR (support vector regression) loss when regression is required. Adding a fern, which adds $2^K$ features to the predictor, requires optimization over the bit function parameters $\Theta^m$, and the aggregation area $A^m$. These are chosen greedily so that the added features align well with the gradient of the current predictor. Following [1], beyond bit functions comparing two pixels, bit functions comparing one pixel to a threshold are also used, as well as spatial bits providing information regarding the pixel location.

Hand Pose Estimation Pipeline

Hand pose information is extracted in an algorithmic pipeline having multiple stages: hand segmentation, hand centering, global orientation classification, global pose refinement, fingers pose estimation, and finally, estimation of basic propositions truth values. The main stages (hand pose and finger pose estimation) rely on CTE predictors.

The pipeline stages are first described, followed by an example which is described with reference to FIGS. 6a-j.

Hand Segmentation:

Hand finding is based on two assumptions: hand movement and hand proximity to the camera. The process starts by dropping pixels far from the camera and then partitioning the depthmap into regions corresponding to continuous surfaces. Following that, regions corresponding to static surfaces are dropped. Among the pixels in the remaining regions, the pixel with lowest projection on the 3D direction (0,−1, 2) is chosen as the hand's 'anchor pixel', reflecting the relative position of the camera and user in an expected setting (see FIG. 6a). The hand is then segmented by taking the set of pixels whose 3D distance from the anchor pixel is smaller than a threshold and which form a single connected component up to small gaps (see FIG. 6e).

Hand Centering:

The hand center of mass in 3D is found and a 3D transformation is computed so as to rotate it about the shortest rotation direction onto the camera principal axis. This transformation, together with affine scaling, is then applied to all the hand pixels, and the hand is re-rendered. This process maps all hands to frame center and roughly equal size, thus reducing variation due to perspective projection and distance from camera (see FIG. 6f).

Global Hand Orientation Classification:

The following six parameters constitute a 'global hand pose' in this example: the 3D palm center location and 3D hand orientation. Hand orientation is a main source of variance in hand pose estimation: hands seen from different viewpoints have very different appearances of the palm, the fingers and their mutual occlusion patterns. Therefore coarse global orientation determination is solved as a classification problem, and the pipeline in the next stages is split to different paths according to the classification decision. Instead of thinking about the hand as rotating, it is fixed in a canonical pose at (0,0,0), and the possible camera positions and rotations on the viewing sphere are considered (see FIG. 6b). That is, the position and orientation of the camera relative to the hand is estimated in a hand-centred coordinate system. The camera longitude and latitude determine its position on the unit sphere, and the azimuth is related to the camera rotation around its principal axis (in-plane rotation). Viewpoints in which the hand is seen from the arm direction (first person) are not considered, since they rarely occur in the present scenario.

Longitude/latitude and azimuth are treated differently in this classification. A viewing half-sphere (602, FIG. 6c) is divided into sixteen (latitude, longitude) clusters (see FIG. 6c), and the azimuth is independently divided to eight equidistant clusters centered at rotations of 0°, 45°, ... 315°. During training, the ground truth hand rotation (0°) is used to assign an image to one of the 16×8=128 possible labels. A single CTE classifier is learned with sixteen classes, where output i is trained to discriminate images with azimuth cluster 0 and (latitude, longitude) cluster i from all other images. At test time, the image is rotated eight times in 45° intervals, and submitted to the classifier in each rotation. Since the classifier was trained to discriminate images from a single rotation, seven of the rotated images are expected to get low scores in all their sixteen outputs, and only the correct rotation gets a high i-th output. The highest scoring class among the one hundred and twenty eight outputs determines the (latitude, longitude) orientation cluster, and the azimuth cluster. The hand image is then rotated so as to cancel out the predicted azimuth, (see FIG. 6g).

Global Hand Pose Refinement:

This stage refines the coarse hand orientation and location (known from orientation classification and hand centering stages respectively). The refinement is done in two regression stages, each with six outputs. At each stage, the hand image is re-centered and re-rotated using the current estimates. Then the residual difference between the current estimates and true (center, orientation) values is regressed. During training, two such consecutive stages are trained for each (longitude, latitude) cluster, for a total of 16×2=32 CTE-regressors. However, when testing only two regressors corresponding to the chosen cluster are activated.

Fingers Regression:

This part of the pipeline includes three regression stages (see FIGS. 6h-j) trained separately for each (longitude, latitude) cluster. The first stage operates on the rotated and centered hand image and regresses the rough location of the five fingertips. Following that, two finger refinement stages take place for each finger separately. At each stage, the image is translated to have the finger of interest centered according to the current estimation, and the residual translation of the real finger is regressed. At the second stage, the position of the distal finger joint is also regressed, in order to get the finger direction by subtracting it from the fingertip. Overall there are 1+2×5=11 regressors activated at this stage, and 11×16=176 regressors are trained for all clusters.

Basic Propositions Truth Value:

As described earlier, each of the one hundred and two propositions has an operational definition in terms of global palm direction, fingertip locations or fingertip directions.

Given the estimations of the latter, the truth value of the relevant basic propositions can be readily estimated.

Overall, the estimation system contains two hundred and nine CTE predictors, but only twenty one CTE activations are performed at test time per frame. Such a multi-classifier approach is possible due to the very low computational cost of CTE predictors. For example, a classifier with m=20 ferns, C=10 class, K=12 bits and an aggregation area of 64×64 pixels runs at 550 μS on a single thread of an i7-3120QM CPU@2.6 GHz processor.

To further aid illustration, FIGS. 6a-j are considered.

Figure 6A:
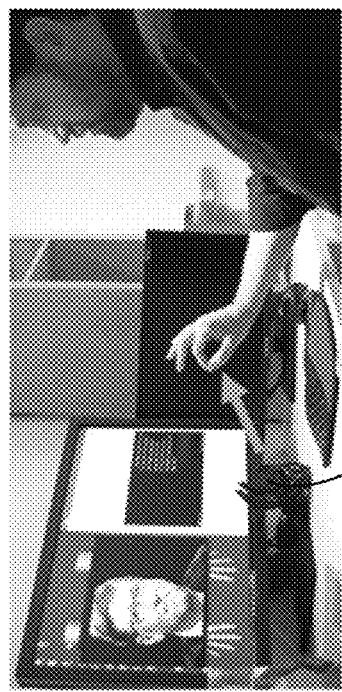
FIG. 6a illustrates an example user setting for gesture recognition.
Figure 6B:
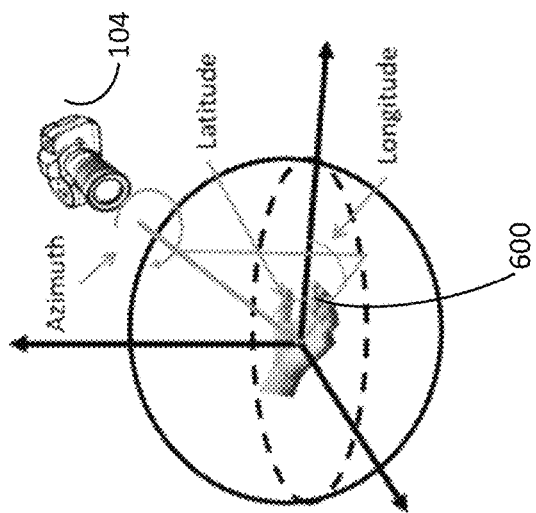
FIG. 6b shows an example of a hand-centred angular coordinate system.
Figure 6D:
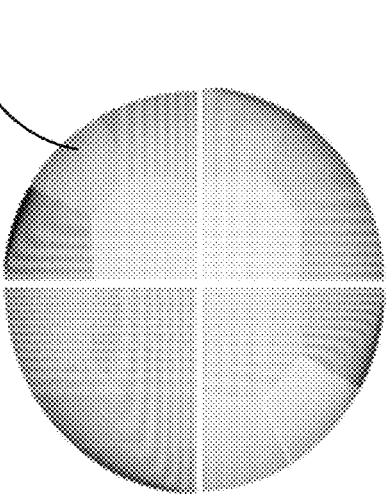
FIG. 6d shows example apparatus used to collect training data for training predictors.
Figure 6C:
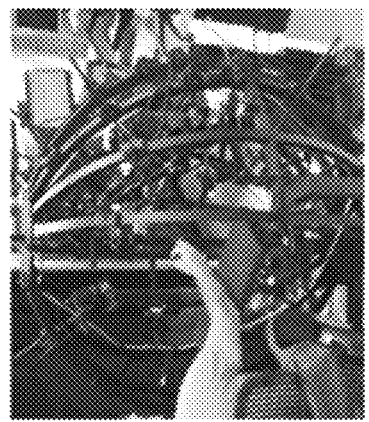
FIG. 6c shows example (latitude, longitude) global hand pose clusters used to classify images.

FIG. 6a; Hand estimation pipeline: in a typical user setting in the present context, the hand is typically the dynamic object closest to the camera 104 in the direction shown. As shown in FIG. 6b, Latitude, longitude and azimuth of the camera 104 relative to the user's hand 600 are measured in a hand-centered coordinate system. FIG. 6C shows example clusters uses on the (latitude, longitude) sphere 602, viewed from the right axis in FIG. 6b. FIG. 6d shows an example of an iron dome used for gathering training data, corresponding to the half-sphere 602 of FIG. 6c.

Figure 6E:
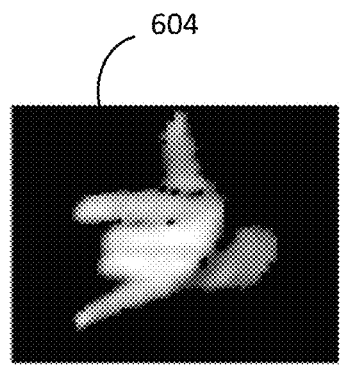
FIGS. 6e, 6f, 6g, 6h, 6i, and 6j illustrate how an example hand image may be processed at different algorithmic pipeline stages.
Figure 6F:
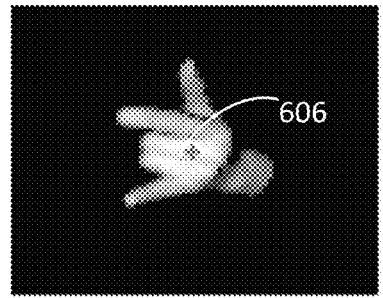
Figure 6G:
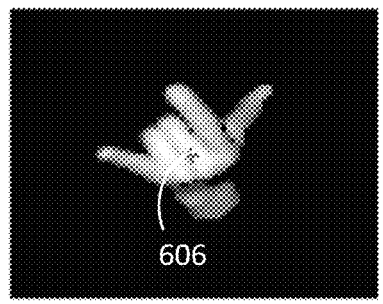
Figure 6H:
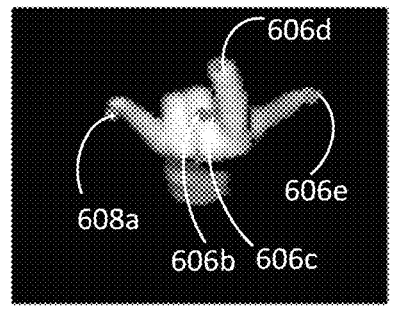
Figure 6I:
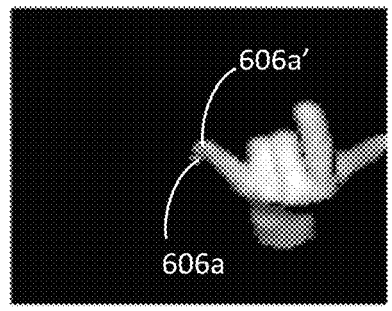
Figure 6J:
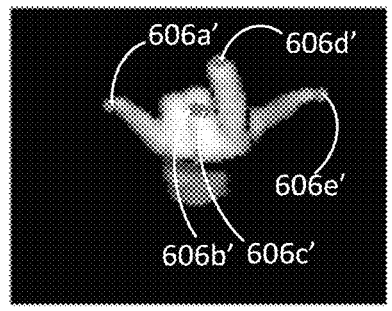

FIG. 6e shows a segmented hand patch 604 and FIG. 6f shows the hand patch 604 after centering, with the estimated hand center labelled 606. FIG. 6g shows the hand after coarse (latitude, longitude) finding and azimuth correction. FIG. 6h shows the hand after global hand pose refinement and initial fingertip location regression, with the tips of the fingers and thumbs (fingertips) labelled 606a-e, before refinement of the fingertip locations FIG. 6i shows a finger-centered image sent for finger refinement, in which point 606a' represents a refinement of the original fingertip location estimate 606a. FIG. 6j shows the final fingertip location estimates 606a'-e' once they have been refined.

Extensions:

In addition to static hand poses, motion elements may be added to the language as additional basic propositions.

Propositions of fingertip relations may also benefit from additional accuracy improvements. There are several clear avenues for increased pose estimation accuracy in the system. One direction is the incorporation of temporal information and/or a generative 3D model. This reasoning is highly complementary to the single-frame discriminative reasoning currently used in the system. Another element with a significant potential for improvement is adding a fingertip detection module to complement the currently used regression stages. This can improve accuracy for the cases where the fingertips are visible.

Data and Annotation Gathering

In the CTE framework, gathering a large annotated dataset is the key for test time speed, since a larger data set allows usage of larger tables (larger K) and therefore fewer ferns (lower M)—see [2] for the details. To generate the results referred to below, data was gathered using Intel's RealSense SR300 camera, providing 640×480 depth and IR images using coded light technology. In order to get a large dataset, an iron dome was constructed, with up to twenty three affixed Intel cameras and eight high definition RGB cameras, all pointing toward the dome center (See FIG. 6d). All of the cameras were jointly calibrated and synchronized (synchronization is required due to the active nature of the cameras, which may cause interference). Using this construction, a hand pose in the center of the dome provides twenty three depth images, and annotation obtained can be readily propagated between them.

The RGB cameras are used to obtain the annotation needed: global hand pose, as well as location of fingertips and distal finger joints. The positions of key joints were marked on each subject's right hand using colors not seen by the IR cameras. Specifically, 3 points and one short line were marked on the back of the hand, for determination of the global hand pose. When the hand is placed at the dome's center, each such point is seen by at least 2 RGB cameras, so its 2D image position was automatically detected, and its 3D point location was found by triangulation. In this manner, the global pose annotation is found automatically. For fingertips and other joint locations this automatic annotation could not be achieved due to marker confusion and occlusion problems, so manual annotation was used.

Altogether 89,333 images were collected and automatically tagged for global hand pose training. To this virtual samples were added, created from the original samples using in-plane rotation. For fingertips detection 274,068 images were manually annotated. This large a sample is required since 16 different fingertip detection pipelines are trained, one per (longitude, latitude) cluster, using mutually exclusive sub-samples.

In addition to the training data, two bespoke datasets were gathered for evaluation purposes. The first includes 61,397 fully annotated images of random hand poses, used for estimation of fingertip location accuracy and basic proposition estimation. A second dataset includes 507 clips of twelve gestures, performed multiple times by ten different subjects. Prior to recording, the subjects were allowed to train on the twelve gestures for three minutes, to simulate the steady state of experienced users. Clips were annotated with tags marking the temporal intervals in which poses of interest were maintained. In addition, seventeen minutes of intensive non-gesture hand activities were recorded. This dataset is used for estimation of gesture-detection statistics: detection and false alarm rates.

Development Tools

Based on the proposed language, a set of development tools is provided to enable easy hand gesture interface development. Gestures can be programmed in C# using a set of classes, or text-edited by non-programmers. On top of these tools, a visual gesture builder tool is provided, allowing gesture editing with a graphical user interface. The builder includes a visualization tool, which renders hand poses based on their definition in the language.

The Runtime Environment

The hand pose estimation algorithm described in the previous section is an efficient routine running on the user's machine. In order to work with it, the developer builds and registers a Gesture object, which includes a gesture definition and a pointer to a callback function. Upon frame arrival, the runtime system computes the relevant basic propositions—a subset of the 102 propositions that is relevant for currently registered gestures. The execution of each registered gesture is tracked using a simple finite-state machine, monitoring which of the poses were already executed and what pose is expected next. Upon execution of the last pose, the callback function registered with the gesture is called. The direct interface for gesture building is programming in C#, and linking to the runtime library.

Figures 4A, 4B:
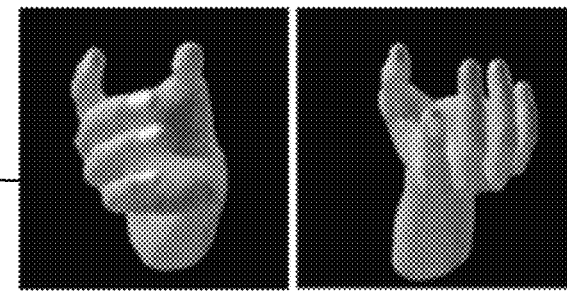

FIG. 4a show an example 'Rotate Right' gesture and FIGS. 4b and 4c show example descriptions of the gesture in formal language. The Rotate Right gesture is composed of two poses 402, 404, starting with the index above the thumb (first pose 402), and ending with the index right of the thumb from the user's perspective (second pose 404).

A C# Interface

Writing a new pose class is done by instantiating anew instance of the SingleHandPose class, and adding the actual propositions content of the pose using predefined enum types. A gesture class is then defined by concatenating a predefined set of pose classes into a sequence. An example of the Rotate Right gesture written in C# is shown in FIG. 4b, including two poses. Since the two poses are similar, they are defined in a single method, accepting as parameter the direction relation required between the thumb and the index. The gesture is defined in a few lines of code, and the lines describing the poses are fairly intuitive, reflecting the tight relation to natural language descriptions.

FIG. 4b shows C# code that generates a Rotate Right gesture object. The two comprising poses 402, 404 are defined using a single method 'CreateIndexThumbPoint-Pose( )' accepting the required index-to-thumb relation as input argument. 'Rotate Right' is then defined as a short sequence of the two poses.

XAML Text Interface

The programming interface is the most straightforward, but it requires programming skills in C# and it mixes the programming work with gesture design, while the two tasks require different expertise and are usually performed by different people. Hence an option to write gesture definitions in an XAML format is provided, which is independent of a specific programming language. 'Rotate Right' written in an XAML format is shown in FIG. 4.c. These files are easier to write, and provide a convenient middle layer for the next design level: a visual gesture builder.

FIG. 4c shows the Rotate Right gesture defined in XAML format. The same propositions are applied, but without the C# syntax.

A Visual Gesture Builder

A more natural way for building gestures is using a visual editor, providing immediate visual feedback. A tool for gesture design in the suggested language has been developed. The gesture is presented as a visual sequence of poses (see FIG. 5). Once a pose is selected, the developer can choose one of the six areas of interest—the palm or one of the fingers—and edit it using a context menu. This menu allows choosing the item's direction and its flexion state (for fingers). For fingers there are four additional items in the menu, allowing one to choose a second finger and establishing the required relation between the two fingers. These relations are chosen from a second-level context menu, and allow specifying fingertip touching and directional relations between the chosen fingers.

When a menu item choice changes, the gesture builder calls a quick inverse kinematics algorithm to find a pose (a vector of joint angle values) which meets the new set of constraints, and renders it instead of the previous pose. When conflicting constraints exist, the inverse kinematics fails to find a valid pose satisfying the constraints, and a warning message is issued. For example, this happens if the thumb and index are instructed to point forward, but the ring is instructed to point left (see FIG. 5d(bottom)). The developer may rotate the camera view of the hand at any time by dragging the mouse inside the pose circle, to better understand the finger locations in complex, partially occluded poses. Once editing is done, the gesture is saved as a XAML file, from which classes representing the new gesture are automatically generated. This tool enables trial and error experimentation in the space of pose definitions, and can significantly accelerate gesture development.

The inverse kinematics algorithm mentioned above has to solve a hard satisfaction problem including non-convex constraints, and do it immediately to enable real time feedback. A coarse-to-fine greedy approach is used, starting from a baseline pose and enforcing constraint families one at a time. First the tool looks for a pose satisfying the palm direction and relative finger direction constraints, as these two constraint types put strong limitations on the global hand orientation. Then finger flexion, finger direction and finger tangency constraints are enforced in that order. In most cases, this process successfully finds a pose satisfying all the constraints if there is one.

Figure 5:
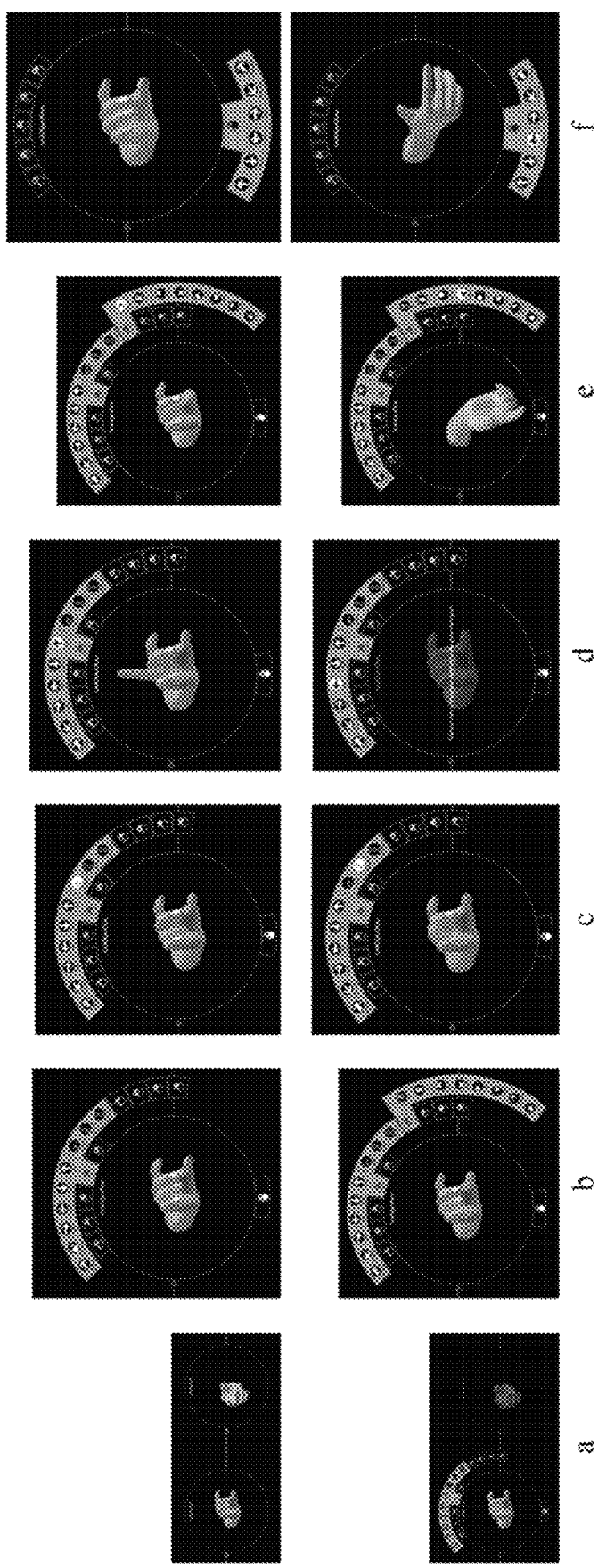
FIG. 5 illustrates an example interface for a visual gesture builder.

FIG. 5 shows an example interface for a visual gesture builder: (a) The builder presents the poses of the gesture as a sequence (top) and allows the developer to choose a pose to edit using a mouse click (bottom). (b) A selected finger is marked in blue, and opens a context menu (top), from which a second menu enables choosing a second finger, marked in red (bottom), (c) A selected finger can be constrained to be in folded (top) or open (bottom) state. (d) Finger direction can be chosen, up in the example (top), but if it cannot be reconciled with current constraints an alert message is displayed instead (bottom), (e) When two fingers are marked, in relation of tip touching (top) and relative locations (bottom) can be stated. (f) The palm can be marked, then rotated to a different direction.

Empirical Results

In most of the hand pose estimation literature, system performance is measured using statistics of 3D deviations between true finger locations and their estimates. Results are reported using these measures on the test data, and compare to other methods on two publicly available datasets. However, for practical gesture recognition performance beyond deviation statistics were also measured on two higher level tasks: estimating the truth value of the one hundred and two basic propositions, and detecting actual gestures phrased in the disclosed language.

3D Finger Deviations—Comparison to State of the Art

Experiments were conducted with two publicly available datasets: NYU and Dexter. NYU is a large dataset with N=8252 test images including challenging poses. Dexter is a smaller (N=2931) and easier dataset, where the hand is frontal in most of the poses and all fingertips are usually visible. The methodology of [3] was used to map the output joints of the present method to ground truth joints of the specific dataset. In both these datasets, the hand movement is often relatively slow compared to natural gestures and the importance of temporal information is emphasized. On the contrary the present method, which is a single-frame algorithm designed to cope with fast gestures, does not use temporal information at all.

[3]: Jonathan Taylor, Lucas Bordeaux, Thomas Cashman, Bob Corish, Cem Keskin, Toby Sharp, Eduardo Soto, David Sweeney, Julien Valentin, Benjamin Luff, Arran Topalian, Erroll Wood, Sameh Khamis, Pushmeet Kohli, Shahram Izadi, Richard Banks, Andrew Fitzgibbon, and Jamie Shotton. 2016. Efficient and Precise Interactive Hand Tracking Through Joint, Continuous Optimization of Pose and Correspondences. ACM Trans. Graph. 35, 4 (July 2016), 143: 1-143:12.

Results were collected both for the "pure" algorithm (applied directly to captured frames) and for the algorithm after applying a simple temporal median filter independently (i.e. to filtered images) for each joint location, with a window of five frames.

Figure 7:
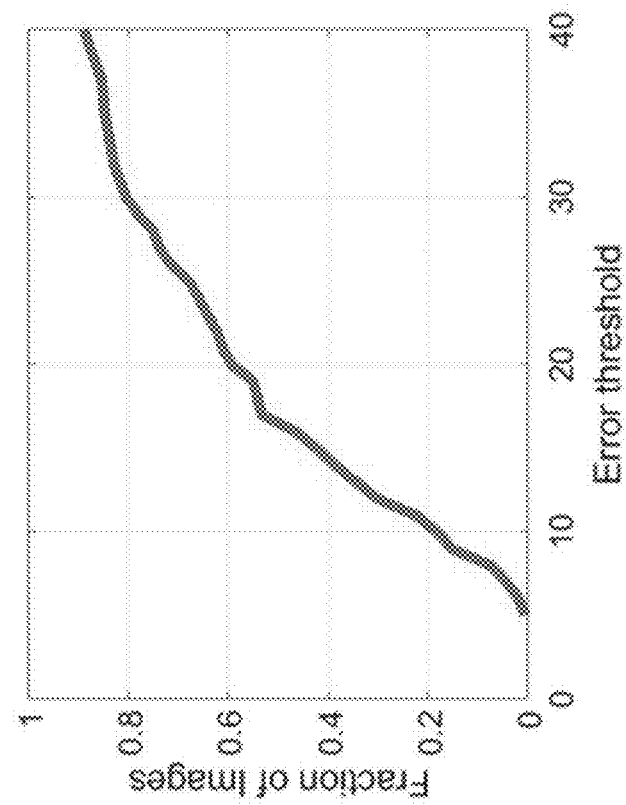
FIG. 7 shows empirical results from testing of the described system.
Figure 7:
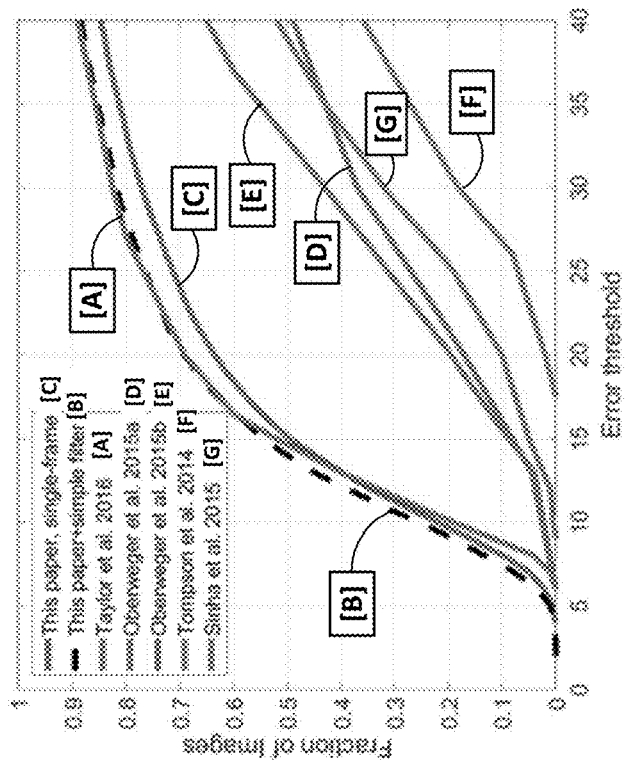

In FIG. 7, left, the NYU results as determined using the present methods (marked "this paper" in FIG. 7) are compared to several alternatives. The graph shows a CDF of maximal deviation in a frame: for each joint the deviation in millimeters between estimated and true location is computed, and the graph shows the fraction of frames in which the maximal deviation is smaller than a threshold. The table in FIG. 7, right, lists the average fingertip estimation error in millimeters on Dexter data set for the present algorithm and alternative methods. FIG. 7, center shows the maximal deviation CDF on the bespoke test set. This set is an order of magnitude larger than the others, and it contains diverse, random hand poses taken from the covered half of the viewing sphere.

The comparison to alternatives shows that the present method is comparable to the state-of-the-art method on NYU, and slightly lower on Dexter. The higher relative ranking on NYU indicates that the strength of the present method is mostly with hard poses, where finger occlusion is prevalent. When comparing to the state-of-the-art methods, several points should be noted: First, the present method runs in 11.5 ms on a single thread (laptop with i7-4810MQ @2.8 Gigahertz (GHz)), while the better performing method is reported to consume most of the CPU on an 8-core, 16-thread machine. The present method is therefore at least one order of magnitude faster. This is also true regarding the existing methods accurate on Dexter, which run on GPU. Second, unlike these alternatives, the present method is able to draw inferences using a single frame, and is therefore more robust for fast and abrupt hand motions which are prevalent in natural gesturing.

Information from multiple frames may be considered by the present system, by applying temporal filtering to the frames before processing.

Basic Proposition Accuracy

The algorithm was tested in the task of estimating the truth value of the hundred and two basic language propositions, using the bespoke test set of 61,397 images. For each image the basic proposition's truth value was computed using the algorithm estimations, and compared to the truth value computed using the ground truth joint locations. Since continuous hand orientation angles are quantized into discrete directions, a margin of +/−15 degrees between positive and negative zones was allowed, and borderline cases with such low margins were ignored. In addition, for finger posture propositions, cases where the palm direction is away from the camera were excluded. For example, if a pose is defined with the palm backward, it does not make sense to add a fingertip touching condition, as fingers are occluded. This does not factor out all types of occlusions, as one finger may occlude other fingers. However, the present hand pose recognizer can deal with most of these types of occlusion. Detection and false alarm rates for families of basic propositions are reported in Table 1, below. Among the basic proposition types, finger tangency and finger relative location are the hardest to detect, since successful detection requires accurate estimation of two fingertip locations, both of which may be occluded.

Gesture Recognition Accuracy

Detection rates on the new gestures dataset are shown in Table 2, below. Most gestures are detected well, with detection rates above 90%, with the 'Swipe down' gesture as an exception with a detection rate of 78%. It was found that one of the main reasons for failures is that subjects do not perform a gesture as intended, even after it is shown to them.

TABLE 1

Detection and false alarm rate for basic propositions.

| Propositions | Detection | False Alarm |
|---|---|---|
| Palm direction | 0.99 | 0.001 |
| Finger direction | 0.96 | 0.006 |
| Finger flexion | 0.91 | 0.043 |
| Finger tangency | 0.86 | 0.019 |
| Finger non-tangency | 0.98 | 0.005 |
| Finger relative location | 0.87 | 0.018 |
| Overall | 0.92 | 0.014 |

TABLE 2

Detection rates for 12 gestures using the bespoke data set. The average detection rate is 96%.

| Gesture | Detection Rate | Gesture | Detection Rate |
|---|---|---|---|
| Hang Up | 1.00 | Explode | 1.00 |
| Swipe Up | 1.00 | Mute | 0.97 |
| Like | 1.00 | Shoot | 0.94 |
| Lock | 1.00 | Flute | 0.92 |
| Bloom | 1.00 | Tap | 0.91 |
| Rotate Right | 1.00 | Swipe Down | 0.78 |

The false alarm rate in real-usage scenario is very low, since in realistic scenarios the users keep their hands down most of the time. In addition, most of the gestures are registered only in a specific context (for example, when a certain window is in focus), so they are active only for a fraction of the activity time. Modeling the realistic hand activity distribution is hence very inefficient as it would require gathering many hours of mostly irrelevant data. Instead, the bespoke test data includes 17 minutes of intensive non-gesture hand activity, on which the false alarm rate is 1.21 (false alarms)/minute.

DISCUSSION

The present method can be measured using several different metrics:

Can a non-expert define poses and gestures? How long does it take?

How expressive is the proposed language?

What is the gesture recognition accuracy?

Regarding the first question above, software engineers and designers, with no experience in computer vision, were all able to learn from sample code, and define poses and gestures on their own in a few minutes.

The issue of gesture recognition accuracy is complex to estimate, and may be separated into two levels: the accuracy at recognizing poses and gestures performed according to the formal definitions, and the accuracy at understanding user intent. As can be seen in FIG. 7 and Table 1, the algorithmic pipe has state of the art accuracy in finger location, and high recognition rates of the language's basic propositions. Despite being multi-staged, the system is very robust, mainly because solving for the palm global parameters, which is done in the first stages, is much easier than fingertip location done later. Specifically, the accuracy of the first stages, including palm orientation detection is very high, with 98.6 of the cases ending with very low deviations.

There are several quite different approaches to the hand pose estimation problem. One line of work uses a 3D hand model and addresses the problem as model-based tracking. These methods are usually accurate, but require high computational effort. Another direction uses ensembles of trees or ferns for pose estimation from a single frame. The advantages are the ability to run with a low computational budget and to comprehend fast motion. The described techniques belong to this algorithmic family, but significantly improve the accuracy relative to existing techniques in this family.

The features of the techniques described herein are platform-independent, meaning that the techniques may be implemented on a variety of commercial computing platforms having a variety of processors. For example, the gesture recognition device 100 may include a computer-readable medium that may be configured to maintain instructions that cause the systems, and more particularly any operating system executed thereon and associated hardware of the system to perform operations. Thus, the instructions function to configure the operating system and associated hardware to perform the operations and in this way result in transformation of the operating system and associated hardware to perform functions. The instructions may be provided by the computer-readable medium to the system processor(s) through a variety of different configurations. One such configuration of a computer-readable medium is signal-bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A gesture recognition method comprising:
receiving at a processor from a sensor a sequence of captured signal frames for extracting hand pose information for a hand;
using at least one trained predictor executed on the processor to extract the hand pose information from the received signal frames;
for at least one defined gesture, wherein the gesture is defined as a time sequence comprising hand poses, wherein each of the hand poses is defined as a conjunction or disjunction of qualitative propositions relating to interest points on the hand:
computing truth values for the qualitative propositions using the hand pose information extracted from the received signal frames, and
tracking execution of the gesture, by using the truth values to determine which of the hand poses in the time sequence have already been executed and which of the hand poses in the time sequence is expected next, wherein upon completion of the sequence, a function associated with the gesture is triggered.

2. A gesture recognition method according to claim 1, wherein the interest points comprise the fingertips and palm center of the hand.

3. A gesture recognition method according to claim 1, wherein the qualitative propositions are obtained by applying predicates to the interest points of the hand.

4. A gesture recognition method according to claim 3, wherein the predicates comprise at least one of the following predicates: palm direction, palm orientation, finger direction, finger flexion, finger tangency, finger relative position.

5. A gesture recognition method according to claim 1, wherein the hand pose information is extracted in multiple stages, wherein at each of the stages a piece of the hand pose information is extracted using a set of one or more predictors.

6. A gesture recognition method according to claim 5, wherein the piece of hand pose information is extracted from each of the signal frames at a later one of the stages in dependence on the piece of hand pose information extracted from that signal frame at an earlier one of the stages.

7. A gesture recognition method according to claim 6, wherein only a subset of one or more predictors selected from a set of available trained predictors is activated at the later stage to extract the piece of hand pose information from that signal frame at the later stage, that subset of predictors being selected for that signal frame based on the piece of information extracted from that signal frame at the earlier stage.

8. A gesture recognition method according to claim 7, wherein at the earlier stage a trained classifier is used to classify the signal frame as belonging to at least one of a plurality of global hand orientation clusters, the piece of hand pose information being extracted at the later stage in dependence on the global hand orientation cluster to which the signal frame belongs.

9. A gesture recognition method according to claim 8, wherein at the later stage the piece of hand pose information is extracted using at least one trained regressor.

10. A gesture recognition method according to claim 9, wherein only a subset of one or more regressors selected from a set of available trained regressors is activated at the later stage to extract the piece of hand pose information from that signal frame at the later stage, that subset of regressors being selected for that signal frame based on the global hand orientation cluster to which the signal frame belongs.

11. A gesture recognition method according to claim 10, wherein the subset of one or more regressors is used to determine a refined global hand orientation estimate, or location information for at least one finger of the hand.

12. A gesture recognition method according to claim 11, wherein regression is performed separately for multiple fingers to determine location information for each of those fingers.

13. A gesture recognition method according to claim 9, wherein a fixed number of regression stages is performed for each of the signal frames.

14. A gesture recognition method according to claim 1, wherein the predictors are convolutional tables ensemble (CTE) predictors.

15. A gesture recognition method according to claim 1, wherein extracting the hand pose information comprises estimating a hand pose for each of the signal frames.

16. A gesture recognition method according to claim 1, wherein the signal frames are filtered signal frames generated by applying a temporal filter to unfiltered frames captured by the sensor, whereby each of the filtered signal frames comprises information from multiple unfiltered frames.

17. A method according to claim 1, wherein the sensor comprises a camera and the signal frames are images of the hand captured by the camera.

18. A gesture recognition method according to claim 1, wherein the time sequence also comprises at least one motion element, which is a qualitative indicator of hand motion.

19. A storage device storing executable instructions that, when executed on a processor, cause the processor to implement a method comprising:

receiving at the processor from a sensor a sequence of captured signal frames for extracting hand pose information for a hand;

using at least one trained predictor executed on the processor to extract hand pose information from the received signal frames;

for at least one defined gesture, wherein the gesture is defined as a time sequence comprising hand poses, wherein each of the hand poses is defined as a conjunction or disjunction of qualitative propositions relating to interest points on the hand:

computing truth values for the qualitative propositions using the hand pose information extracted from the received signal frames, and tracking execution of the gesture, by using the truth values to determine which of the hand poses in the time sequence have already been executed and which of the hand poses in the time sequence is expected next, wherein upon completion of the sequence, a function associated with the gesture is triggered.

20. A gesture recognition device comprising:

a sensor for use in capturing a sequence of captured signal frames for extracting hand pose information for a hand;

a processor configured to receive from the sensor a sequence of captured signal frames for extracting hand pose information for a hand, and to execute at least one trained predictor to extract hand pose information from the received signal frames;

wherein the processor is configured to implement the following operations for at least one defined gesture, wherein the gesture is defined as a time sequence comprising hand poses, wherein each of the hand poses is defined as a conjunction or disjunction of qualitative propositions relating to interest points on the hand:

computing truth values for the qualitative propositions using the hand pose information extracted from the received signal frames, and tracking execution of the gesture, by using the truth values to determine which of the hand poses in the time sequence have already been executed and which of the hand poses in the time sequence is expected next, wherein upon completion of the sequence, the processor is configured to trigger a function associated with the gesture.

* * * * *